(12) United States Patent
Huang et al.

(10) Patent No.: US 8,743,201 B2
(45) Date of Patent: Jun. 3, 2014

(54) TIME-SEQUENTIAL MULTI-SPECTRUM IMAGING DEVICE

(75) Inventors: Po-Hsuan Huang, Hsinchu (TW); Ming-Fu Chen, Hsinchu (TW)

(73) Assignee: National Applied Research Laboratories, Hsinchu (TW)

( * ) Notice: Subject to any disclaimer, the term of this patent is extended or adjusted under 35 U.S.C. 154(b) by 534 days.

(21) Appl. No.: 12/891,465

(22) Filed: Sep. 27, 2010

(65) Prior Publication Data

US 2012/0075470 A1    Mar. 29, 2012

(51) Int. Cl.
*H04N 7/18* (2006.01)
*H04N 13/04* (2006.01)

(52) U.S. Cl.
USPC .......................................... 348/144; 356/419

(58) Field of Classification Search
USPC .......................................................... 348/144
See application file for complete search history.

(56) References Cited

U.S. PATENT DOCUMENTS

| | | | | |
|---|---|---|---|---|
| 5,428,417 A | * | 6/1995 | Lichtenstein | 353/122 |
| 6,061,140 A | * | 5/2000 | Berg et al. | 356/418 |
| 7,489,396 B1 | * | 2/2009 | Vrhel et al. | 356/319 |
| 7,635,189 B2 | * | 12/2009 | DeCusatis et al. | 353/84 |
| 7,835,002 B2 | * | 11/2010 | Muhammed et al. | 356/419 |
| 8,172,399 B2 | * | 5/2012 | DeCusatis et al. | 353/8 |
| 8,189,038 B2 | * | 5/2012 | DeCusatis et al. | 348/58 |
| 2005/0111090 A1 | * | 5/2005 | Kleinteich et al. | 359/381 |
| 2006/0066540 A1 | * | 3/2006 | Hewlett et al. | 345/84 |
| 2007/0141605 A1 | * | 6/2007 | Vann et al. | 435/6 |
| 2009/0321259 A1 | * | 12/2009 | Vann et al. | 204/452 |
| 2010/0296705 A1 | * | 11/2010 | Miksa et al. | 382/106 |
| 2011/0181757 A1 | * | 7/2011 | Fish et al. | 348/239 |

* cited by examiner

*Primary Examiner* — Sath V Perungavoor
*Assistant Examiner* — Howard D Brown, Jr.
(74) *Attorney, Agent, or Firm* — WPAT, P.C.; Anthony King

(57) ABSTRACT

The present invention discloses a time-sequential multi-spectrum image acquiring device structure which uses a single camera module to achieve multi-spectrum image acquiring in a time-sequential architecture, thereby providing a simple, lightweight telemetry system and reducing the development and operation costs thereof. For example, a visible and near infrared (VNIR) imaging system reduces the use of four camera modules (each including an optical lens, filter, sensor, and image signal processing unit) to single camera module, the VNIR imaging system acquires multi-spectrum images having the same image geometric parameters for image calibration and can simplify the calibration process.

The present invention is implemented by introducing a multi-spectrum filter wheel capable of rotating in high speed in the camera module and controlling the image acquiring frequency of the sensor and the synchronicity of the wheel rotating speed for multi-spectrum image acquiring. The present invention is suitable for use in multi-spectrum images acquiring of airborne telemetry requiring lightweight system, such as multi-spectrum images acquiring of unmanned aerial vehicle (UAV).

8 Claims, 7 Drawing Sheets

TIME-SEQUENTIAL MULTI-SPECTRUM IMAGING DEVICE

BACKGROUND OF THE INVENTION

1. Field of the Invention

The present invention relates to a multi-spectrum imaging device structure, which is particularly suitable for image acquisition of airborne telemetry; the time-sequential multi-spectrum imaging device is provided for acquiring images of different spectrums to greatly reduce the system complexity, weight and development cost; wherein the acquired images are processed by a back-end software for subsequent applications.

2. Description of the Prior Art

Recently, telemetry techniques are often applied in research, analysis and other applications for environmental agricultural, and geographic fields, among which the image acquisition of airborne telemetry is widely adopted, while multi-spectrum images are often used in all kinds of telemetry research. Traditionally a multi-spectrum imaging system uses a plurality of cameras for image acquisition, and also for analyzing and utilizing the multi-spectrum images.

The traditional multi-spectrum imaging system adopts a multi-camera architecture, which shoots the same photographing area at the same time to obtain images with different spectrums; these images of different spectrums are compared and processed by back-end software to obtain high contrast images for further applications. However, since the traditional multi-spectrum imaging system is consisted of multiple cameras and tends to be bulky, if it is necessary to install the multi-spectrum imaging system on vehicles, particularly an aircraft, the weight of the system could be a burden for the aircraft; besides, the multi-camera architecture means more cost and requires more system integration and optical calibration works to be done according to different parameters and spectrum requirements for the multi-camera architecture.

Therefore, the prior-art technique presents several shortcomings to be overcome.

SUMMARY OF THE INVENTION

It is an object of the present invention to introduce a multi-spectrum filter wheel capable of rotating in high speed in the camera module and controlling the image acquiring frequency of the sensor and the synchronicity of the wheel rotating speed for multi-spectrum image acquiring, thereby reducing the weight of the traditional multi-spectrum imaging system and simplifying the optical and mechanical structure thereof to achieve lower cost. The obtained multi-spectrum images have the same image geometric correction parameters for image calibration and can simplify the calibration measurement process.

The present invention is suitable for use in multi-spectrum image acquisition of airborne telemetry requiring lightweight system, such as multi-spectrum images acquiring of unmanned aerial vehicle (UAV).

DETAILED DESCRIPTION OF THE PREFERRED EMBODIMENT

Figure 1:
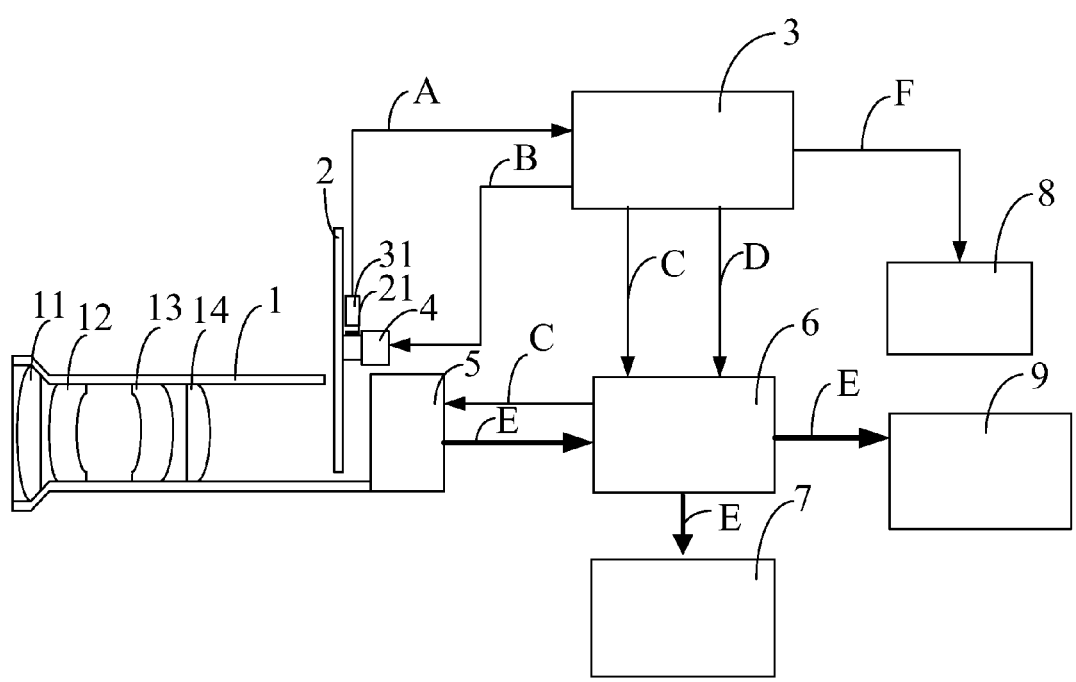
FIG. 1 illustrates a structure and a signal flow view of the present invention.
Figure 2:
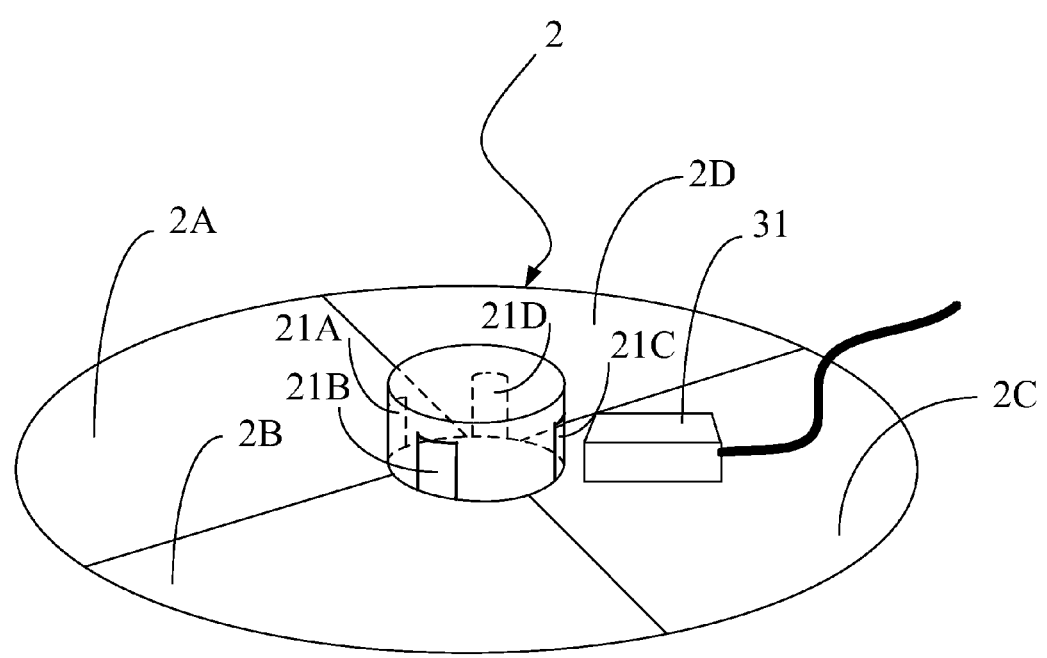
FIG. 2 illustrates a close view of the multi-spectrum filter wheel.
Figure 6:
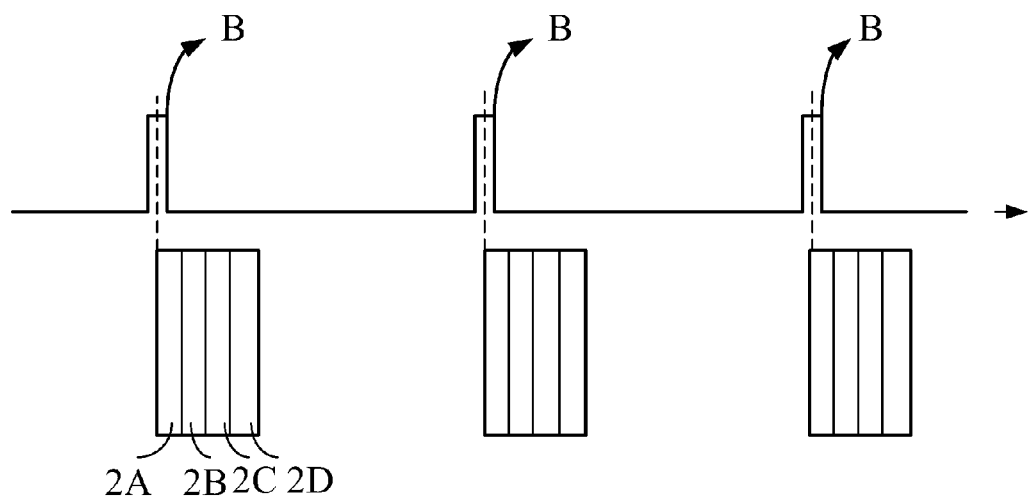
FIG. 6 illustrates a timing diagram of a wheel driving signal in the present invention.

Please refer to FIG. 1, FIG. 2 and FIG. 6, which illustrate the operation of the present invention, based on the type of the sensor, the sampling rate, and the required task, setting a sequential time and rotating speed of the multi-spectrum filter wheel (2) at the control module (3) of the wheel and the sensor; the control module (3) of the wheel and the sensor transmitting a wheel driving signal (B) to the driving module (4) of the wheel based on the preset sequential time and rotating speed to let the multi-spectrum filter wheel (2) rotate according to the preset sequential time and rotating speed.

Figure 7:
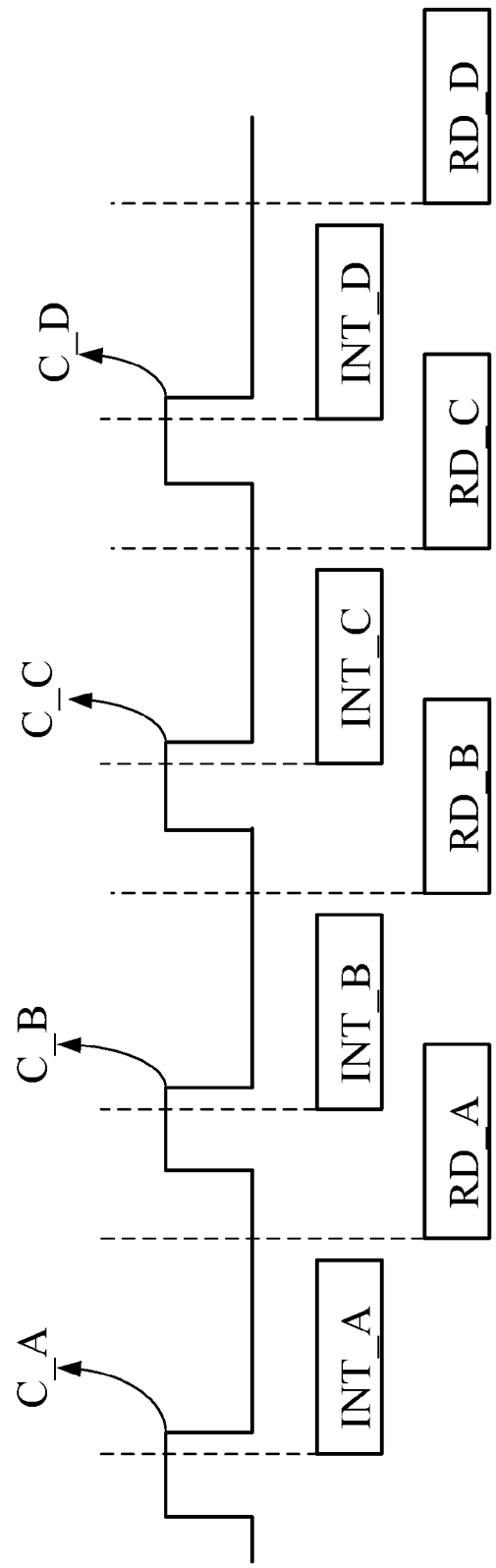
FIG. 7 illustrates a timing diagram of a sensor trigger signal in the present invention.

Please refer to FIG. 1, FIG. 2, FIG. 6, and also FIG. 7, when the multi-spectrum filter wheel (2) is rotating in the counter-clockwise direction, the detector (31) and the control module (3) of the wheel and the sensor sweeps through the multi-spectrum filter wheel (2) for one circle (2A→2B→2C→2D) and detects driving marks (21A→21B→21C→21D), then the detector (31) transmits a trigger signal (A) to the control module (3) of the wheel and the sensor; the control module (3) of the wheel and the sensor processes the trigger signal and transmits a charge coupled device trigger signal (C A→C B→C C→C D) and an image acquiring module control signal (D) to the image acquiring module (6), and also transmits a trigger event signal (F) to an inertia measuring system (8); then the image acquiring module (6) transmits the charge coupled device trigger signal (C A→C B→C C→C D) to the sensor (5); the sensor (5) integrates the image data (INT_A→INT_B→INT_C→INT_D) for the image acquiring module (6) to read the image data (RD_A→RD_B→RD_C→RD_D) in the sensor (5); after a fixed period of time, the image acquiring module (6) transmits the image data to a display (7) and an image data recorder (9); the image data recorder (9) provides the image data to a back-end software and to the display (7) for displaying real time image; the inertia measuring system (8) obtains orientation data and position data from the gyro and GPS device and provides the inertia data for obtaining position data for further image processing and calibration.

Figure 3:
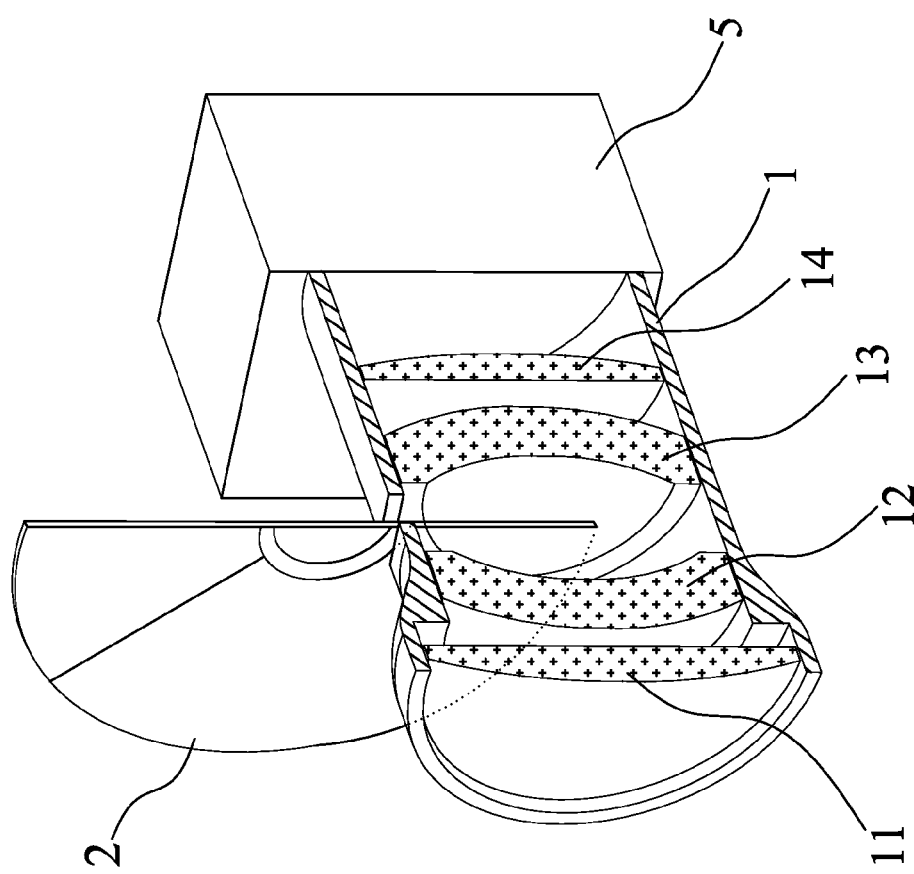
FIG. 3 illustrates a view of the multi-spectrum filter wheel embedded in the front end of a lens module.
Figure 4:
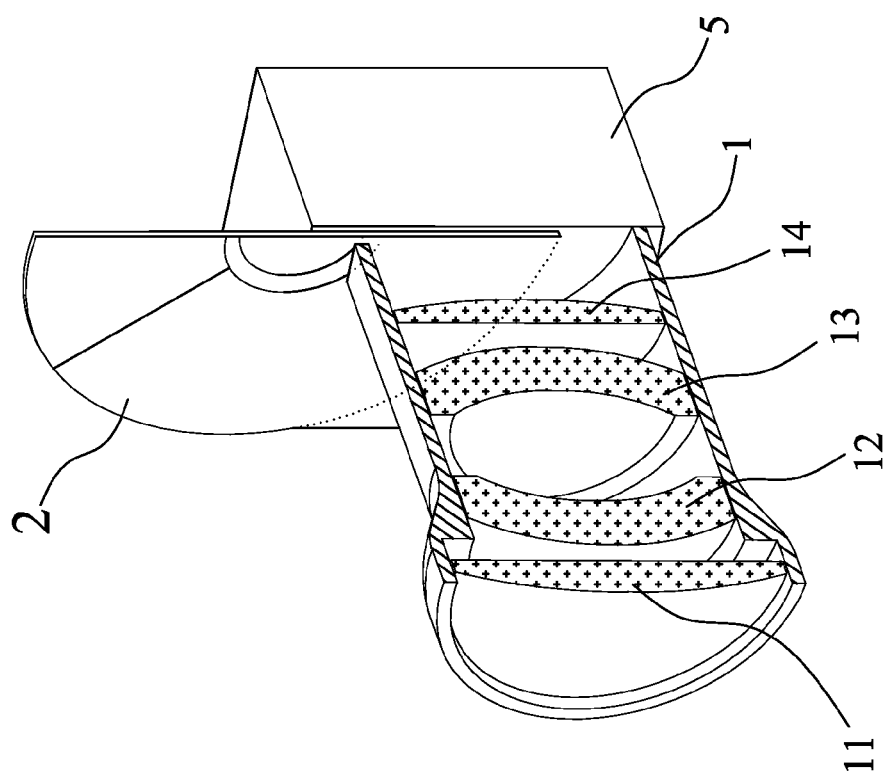
FIG. 4 illustrates a view of the multi-spectrum filter wheel embedded in the back end of a lens module.

Please refer to FIG. 3 and FIG. 4, wherein the multi-spectrum filter wheel (2) can be embedded between the two thick meniscus lens (12, 13) of the lens module or between the sensor (5) and the thin convex lens (14), wherein the placement of the multi-spectrum filter wheel (2) only affects the radius of the multi-spectrum filter (2) and has no effect on the image data obtained by the sensor (5).

Figure 5:
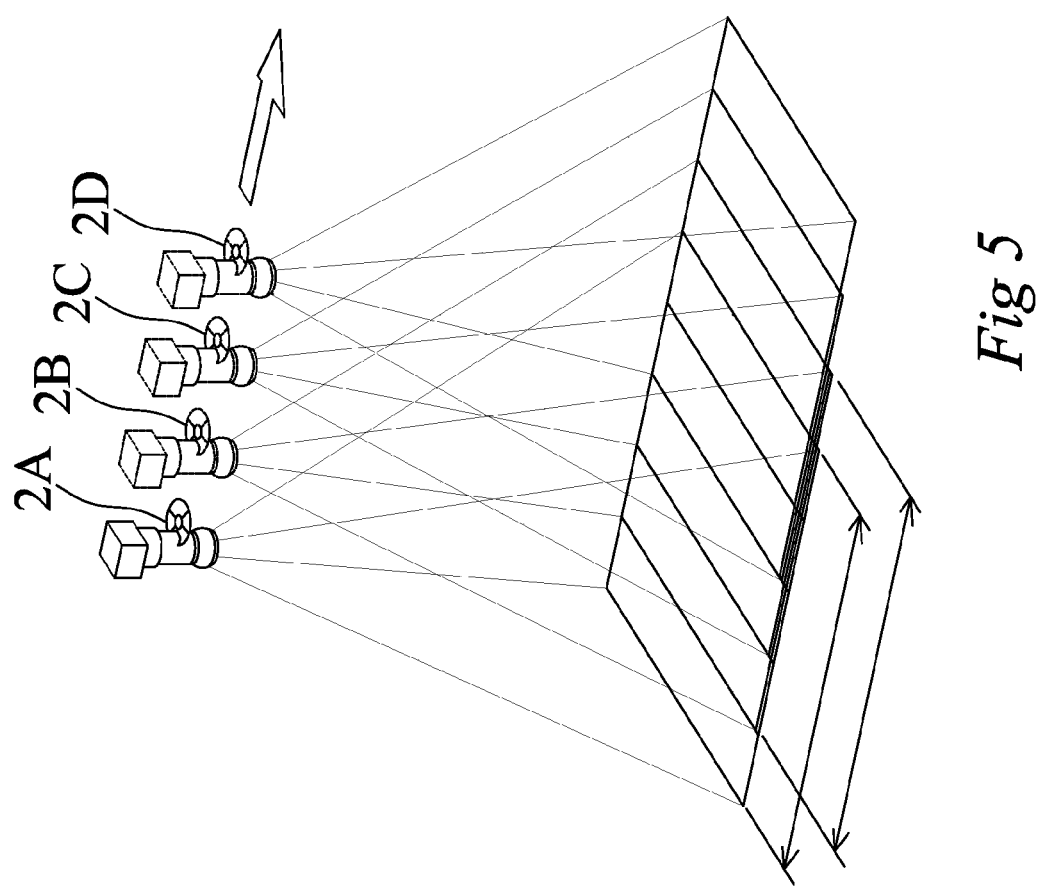
FIG. 5 illustrates a view of the time-sequential multi-spectrum imaging device taking airborne image data.

Please refer to FIG. 5, since the multi-spectrum images are obtained by rotating the multi-spectrum filter to filter the incident light, the acquired images are not 100% overlapped with each other due to time difference; as shown in FIG. 5, when the multi-spectrum filter area is overlapped with a diaphragm area of the sensor at 2A and 2B, the obtained images 2A_P and 2B_P are not 100% overlapped with each other. Therefore, the present invention uses different sampling rates for the sensor and adjusts the parameters of the time-sequential multi-spectrum imaging device in acquiring images of airborne telemetry to achieve nearly 100% overlap and to keep the target image area of different spectrum filters in the same region as close as possible.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A time-sequential multi-spectrum imaging device comprising:
    a lens module coupled with a sensor, the lens module being provided for imaging;
    a sensor coupled with the lens module for sensing images;
    a multi-spectrum filter wheel embedded in the lens module; the multi-spectrum filter wheel comprising a plurality of filters and a plurality of driving marks, wherein each one of the plurality of filters corresponds to a different filter spectrum region and a different one of the plurality of driving marks; the wheel and a detector of a control module of the sensor detecting a driving signal from one of the plurality of driving marks; the wheel switching the image acquiring spectrum for the multi-spectrum images acquisition;
    a driving module of the wheel coupled with the multi-spectrum filter wheel and a control module of the wheel and the sensor; the driving module driving the multi-spectrum filter wheel to rotate and the control module of the wheel and the sensor controlling the rotating speed;
    the control module of the wheel and the sensor coupled with the driving module of the wheel, an image acquiring module, and an inertia measuring system; the control module using the detector to sense the driving mark and transmitting out a control signal to the image acquiring module, the driving module of the wheel, and the inertia measuring system; the image acquiring module being provided for controlling and adjusting the timing in acquiring the multi-spectrum images;
    the image acquiring module coupled with the sensor, the control module of the wheel and the sensor, a display, and a image data recorder; the image acquiring module receiving the control signal from the control module of the wheel and the sensor, reading image data from the sensor, and transmitting the image data to the display and the image data recorder;
    the display coupled with the image acquiring module;
    an inertia measuring system coupled with the control module of the wheel and the sensor for measuring a state and a position of the wheel; and the image data recorder coupled with the image acquiring module for receiving and storing the image data from the image acquiring module; wherein the time-sequential multi-spectrum imaging device uses the time-sequential multi-spectrum image acquiring method, which comprises: based on the type of the sensor, the sampling rate, and the required task, setting a sequential time and rotating speed of the multi-spectrum filter wheel at the control module of the wheel and the sensor; the control module of the wheel and the sensor transmitting a wheel driving signal to the driving module of the wheel based on the preset sequential time and rotating speed to let the multi-spectrum filter wheel rotate according to the preset sequential time and rotating speed; during the rotation of the multi-spectrum filter wheel, the detector of the control module of the wheel and the sensor sweeping through the multi-spectrum filter wheel for one circle and detecting a driving mark, which means the incident light from the lens is now in another filter spectrum region, then the detector transmitting a trigger signal to the control module of the wheel and the sensor; the control module of the wheel and the sensor processing the trigger signal and transmitting a charge coupled device trigger signal and an image acquiring module control signal to the image acquiring module, and transmitting a trigger event signal to the inertia measuring system; the image acquiring module transmitting the charge coupled device trigger signal to the sensor; the sensor integrating the image data for the image acquiring module to read the image data in the sensor; the image acquiring module transmitting the image data to the display and the image data recorder; the image data recorder providing the image data to a back end software and to the display for displaying real time images; the inertia measuring system obtaining orientation data and position data from the gyro and GPS device;
    wherein the time-sequential multi-spectrum imaging device is adapted to utilize airborne remote sensing image-taking in air.

2. The time-sequential multi-spectrum imaging device as claimed in claim 1, wherein the multi-spectrum filter can comprises two to eight spectrums.

3. The time-sequential multi-spectrum imaging device as claimed in claim 1, wherein the sensor can be a CMOS sensor.

4. The time-sequential multi-spectrum imaging device as claimed in claim 1, wherein the sensor can be a CCD sensor.

5. A time-sequential multi-spectrum imaging device comprising:
    a lens module coupled with a sensor; the lens module being provided for imaging;
    a sensor coupled with the lens module for sensing images;
    a multi-spectrum filter wheel embedded between the lens module and the sensor; the multi-spectrum filter wheel comprising a plurality of filters and a plurality of driving marks, wherein each one of the plurality of filters corresponds to a different filter spectrum region and a different one of the plurality of driving marks; the wheel and a detector of a control module of the sensor detecting a driving signal from one of the plurality of driving marks; the wheel switching the image acquiring spectrum for acquiring the multi-spectrum images;
    a driving module of the wheel coupled with the multi-spectrum filter wheel and a control module of the wheel and the sensor; the driving module driving the multi-spectrum filter wheel to rotate and the control module of the wheel and the sensor controlling the rotating speed;
    the control module of the wheel and the sensor coupled with the driving module of the wheel, an image acquiring module, and an inertia measuring system; the control module using the detector to sense the driving mark and transmitting out a control signal to the image acquiring module, the driving module of the wheel, and the inertia measuring system; the image acquiring module being provided for controlling and adjusting the timing in acquiring the multi-spectrum images;
    the image acquiring module coupled with the sensor, the control module of the wheel and the sensor, a display, and a image data recorder; the image acquiring module receiving the control signal from the control module of the wheel and the sensor, reading image data from the sensor, and transmitting the image data to the display and the image data recorder;
    the display coupled with the image acquiring module;

an inertia measuring system coupled with the control module of the wheel and the sensor for measuring a state and a position of the wheel; and the image data recorder coupled with the image acquiring module for receiving and storing the image data from the image acquiring module;

wherein the time-sequential multi-spectrum imaging device uses the time-sequential multi-spectrum image acquiring method, which comprises: based on the type of the sensor, the sampling rate, and the required task, setting a sequential time and rotating speed of the multi-spectrum filter wheel at the control module of the wheel and the sensor; the control module of the wheel and the sensor transmitting a wheel driving signal to the driving module of the wheel based on the preset sequential time and rotating speed to let the multi-spectrum filter wheel rotate according to the preset sequential time and rotating speed; during the rotation of the multi-spectrum filter wheel, the detector of the control module of the wheel and the sensor sweeping through the multi-spectrum filter wheel for one circle and detecting a driving mark, which means the incident light from the lens is now in another filter spectrum region, then the detector transmitting a trigger signal to the control module of the wheel and the sensor; the control module of the wheel and the sensor processing the trigger signal and transmitting a charge coupled device trigger signal and an image acquiring module control signal to the image acquiring module, and transmitting a trigger event signal to the inertia measuring system; the image acquiring module transmitting the charge coupled device trigger signal to the sensor; the sensor integrating the image data for the image acquiring module to read the image data in the sensor; the image acquiring module transmitting the image data to the display and the image data recorder; the image data recorder providing the image data to a back end software and to the display for displaying real time images; the inertia measuring system obtaining orientation data and position data from the gyro and GPS device;

wherein the time-sequential multi-spectrum imaging device is adapted to utilize airborne remote sensing image-taking in air.

6. The time-sequential multi-spectrum imaging device as claimed in claim 5, wherein the multi-spectrum filter can comprises two to eight spectrums.

7. The time-sequential multi-spectrum imaging device as claimed in claim 5, wherein the sensor can be a CMOS sensor.

8. The time-sequential multi-spectrum imaging device as claimed in claim 5, wherein the sensor can be a CCD sensor.

* * * * *